Nov. 4, 1952 L. S. LEWIS 2,616,723
AUTOMOTIVE WELTING
Filed April 19, 1950
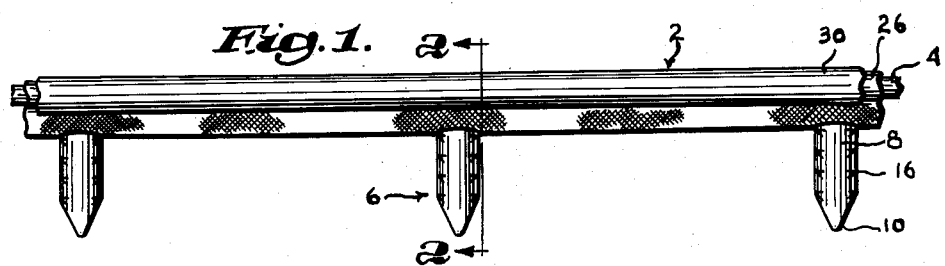
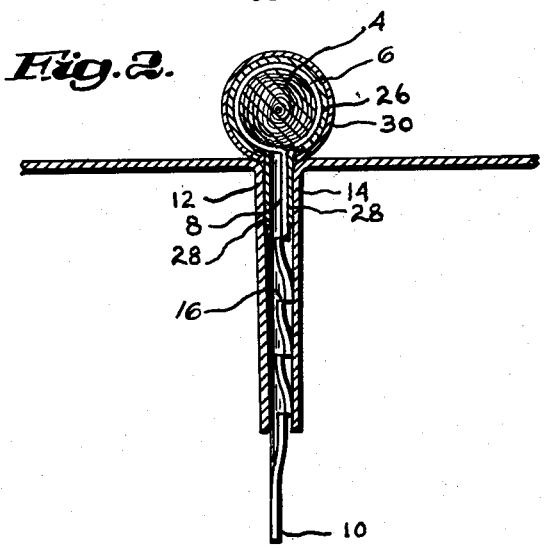
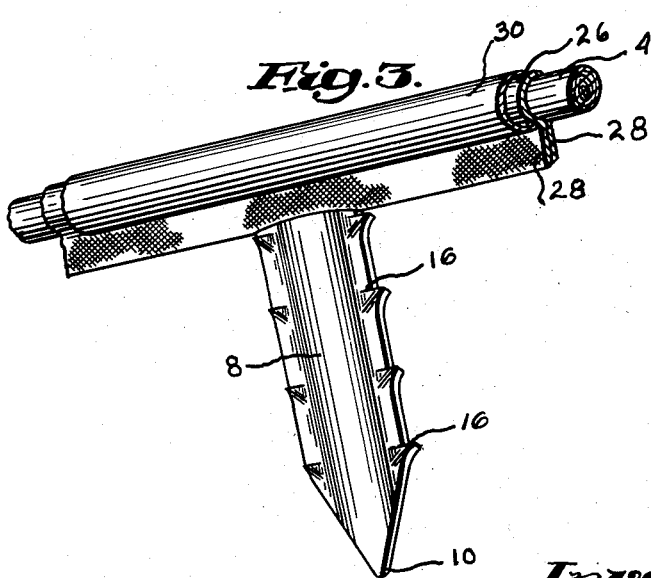
Inventors:
Louis S. Lewis
Arnold C. Rood
by Attorney Patented Nov. 4, 1952

2,616,723

UNITED STATES PATENT OFFICE 2,616,723

AUTOMOTIVE WELTING

Louis S. Lewis, Winthrop, Mass., assignor to Marson Corp., Revere, Mass., a corporation of Massachusetts Application April 19, 1950, Serial No. 156,872

3 Claims. (Cl. 280—153.5)

1

This invention relates to fender welting, and more particularly to fender welting of the metal finish type, of improved and advantageous construction.

When, in the maintenance and repair of automobiles it is necessary to replace the fender welting, the labor involved in replacing the new of the same welting is costly as the fenders must be removed or loosened from the frame parts to which they are secured for the introduction therebetween of the usual welting and then must again be secured in place.

In my co-pending application, Serial No. 156,171 filed April 15, 1950, I have disclosed a form of welting suitable for replacement of fender welting without removing or loosening the fenders of an automotive vehicle from the body or frame thereof. Briefly, this welting is in the form of a flexible strip carrying clips having prongs arranged to be introduced into the joint to be welted and to retain the welting strip firmly in position, and having a plastic protective covering providing protection against wear, weather, and corrosion.

Certain automobile manufacturers are now producing automobiles employing welting lending decorative trim to the body. Such welting is of the metal-finish type having the visible surface of chromium or a similar metal to provide a shiny metal beading.

An object of the invention is to provide a metal-finish fender welting which readily may be associated with automotive members, for the replacement of loosened or damaged fender welting. A further object is to provide fender welting which will provide a durable metal welted finish, and which will remain firmly in place during ordinary conditions of wear, weather and operation of the vehicle.

In accordance with the above and other objects there is provided by this invention a form of metal-finish welting which quickly may be positioned in place between already secured fender and body parts and which is firmly retained in said position. The welting is of durable construction and provides, in addition to a permanently shiny surfaced bead, coverage for any corrosion already apparent between the welted joint, and protection against further corrosion therebetween.

The welting of this invention comprises a flexible longitudinal core with clips surrounding the core at spaced intervals. Each clip carries a prong shaped to permit entry thereof between a fender and another automotive member. A

2 fin-forming strip, which may be of metal-finished fabric, surrounds the core and extends in the direction of the prongs in the form of a fin. A flexible metal covering strip substantially surrounds the core. The fin extends below and beyond the metal cover.

A preferred embodiment of this invention is shown in the accompanying drawings in which Figure 1 is an elevation of a portion of welting according to this invention;

Figure 2 is a cross-sectional view of the welting taken on line 2—2 of Fig. 1, showing the welting disposed between a fender and a body member; and Fig. 3 is an enlarged perspective view showing a small portion of the welting and a prong.

As illustrated in the drawings a welting 2 is provided with a core 4 such as of fibrous cellulosic material, and conveniently kraft paper cord. Clips 6 are shown surrounding the core 4 at intervals along its length, and carry prongs 8 to provide means for holding said welting firmly to the fender joint. These clips 6 are spaced sufficiently close together to hold the welting in place without buckling, and to permit the cutting off of any prong contacting an obstruction without appreciably affecting the positioning of the welting.

The clips 6 suitably may be stamped from sheet metal. The depending arcuate prongs 8 have their side edges displaced to one side of the vertical axis of the clip and the curved median portion of the clip displaced outwardly to the other side of said vertical axis. Each prong 8 is also shaped to provide a pointed end 10 for facilitating its introduction between the assembled fender 12 and body member 14, and further provided with edge serrations 16.

The prongs 8 when introduced between the assembled fender 12 and body part 14 (Fig. 2) will firmly engage the adjacent surfaces, due to the spreading of the arcuate surface of the prongs, and the edge serrations 16 will engage any extraneous material which may be between the adjacent surfaces, such as may have resulted from corrosion or the deterioration of the original welting. The particular configuration given the serrations 16 enables the prongs 8 to be readily introduced but accidental or unintentional removal is prevented.

A flexible fin-forming strip 26 is shown surrounding the core 4 and extending in the direction of the prongs 8 to form a fin 28. The fin 28 conceals and protects the upper portion of the prong 8 and covers the surface of the fender 12 and the body 14 immediately beyond the welt proper, and conceals any corrosion already present.

This fin-forming strip 26 may be formed of any flexible material resistant to wear, weather and corrosion which is inert chemically with respect to the metal or finish of the fender and body members. Preferably this material is a treated fabric such as enameled drill or pyroxylin-treated drill. This covering strip 26 preferably presents a metallic appearance to blend with the metal of the exterior covering so that the fin 28 appears as a continuation thereof. Conveniently metallic pigments may be incorporated in the treating material to provide this effect.

A metal cover 30 is shown rolled over the clip-attached, strip-covered core 4. This cover may be of any suitable thin gauge metal having a permanently decorative finish. Preferably, it comprises chromium-coated zinc.

The embodiment of the invention herein described finds particular application as replacement welting, although it will be apparent that as it remains permanently and firmly in position, it may be used in the initial assembly of the automobile by the manufacturer.

The welting of this invention is readily installed. This conveniently may be accomplished by driving the welting in with a hammer and blocks. The blocks may be of any suitable material such as wood, but preferably comprise Bakelite or hard rubber blocks shaped in a predetermined curve to bend the welting according to the desired curvature. In use as replacement welting, it is necessary only to rip out the old welting and install the present welting as above described.

Having described my invention, what I claim as new and desire to secure by Letters Patent of the United States is:

1. Fender welting comprising, in combination, a flexible longitudinal core, clips surrounding said core at spaced intervals, each said clip carrying an arcuate prong shaped to permit entry of the prong between a fender and another automotive member, a fin-forming strip surrounding the core and extending in the direction of the prongs in the form of a fin, and a flexible metal covering strip substantially surrounding said core, said fin extending beyond said metal cover.

2. Fender welting comprising, in combination, a flexible longitudinal core, clips surrounding said core at spaced intervals, each said clip carrying an arcuate barbed prong shaped to permit entry of the prong between a fender and another automotive member, a metal-finished fin-forming strip surrounding the core and extending in the direction of the prongs in the form of a fin, and a flexible metal covering strip substantially surrounding said core, said fin extending beyond said metal cover.

3. Fender welting comprising, in combination, a flexible longitudinal core, clips surrounding said core at spaced intervals, each said clip carrying an arcuate prong shaped to permit entry of the prong between a fender and another automotive member, a fabric fin-forming strip surrounding the core and extending in the direction of the prongs in the form of a metal-finished fin, and a flexible metal covering strip substantially surrounding said core, said fin extending beyond said metal cover.

LOUIS S. LEWIS.

REFERENCES CITED

The following references are of record in the file of this patent:

UNITED STATES PATENTS

| Number | Name | Date |
|---|---|---|
| 949,570 | Harris | Feb. 15, 1910 |
| 2,377,169 | Mohr | May 29, 1945 |
| 2,483,622 | Burski | Oct. 4, 1949 |
| 2,523,223 | Martin | Sept. 10, 1950 |